United States Patent [19]

De Vivo

[11] 4,167,366
[45] Sep. 11, 1979

[54] REFUSE CONTAINER TRANSPORT

[76] Inventor: Mario De Vivo, One Rowayton Woods Dr., Apt. #1, South Norwalk, Conn. 06854

[21] Appl. No.: 841,590

[22] Filed: Oct. 12, 1977

[51] Int. Cl.² .............................................. B60P 1/48
[52] U.S. Cl. .................................. 414/697; 414/469; 414/551
[58] Field of Search ...................... 214/77 R, 302, 317, 214/501, 130 R, 78, 515, 621, 131 R, 778, 149, 315

[56] References Cited
U.S. PATENT DOCUMENTS

| 2,719,637 | 10/1955 | Wood | 214/501 X |
| 3,297,182 | 1/1967 | Barry | 214/317 |
| 3,966,068 | 6/1976 | Duvia | 214/317 |

OTHER PUBLICATIONS

*Trailer Body Builders, Buyers Guide*, Jul., 1977, pp. 98 & 99.
*Solid Wastes Management*, Jul., 1977, p. 103.

Primary Examiner—Robert G. Sheridan
Attorney, Agent, or Firm—Frank J. Thompson

[57] ABSTRACT

An improved vehicle is described which is adapted both for the handling of refuse containers and for general utility purposes. The vehicle has a chassis, an elongated lifting frame supported by the chassis, and means for elevating a rearward segment of the frame with respect to a rear segment of the chassis. Refuse container engaging arms are supported near a rear segment of the lifting frame and a utility vehicle body is mounted on the lifting frame. The vertical position of the container engaging arms is varied in accordance with movement of the lifting frame.

23 Claims, 10 Drawing Figures

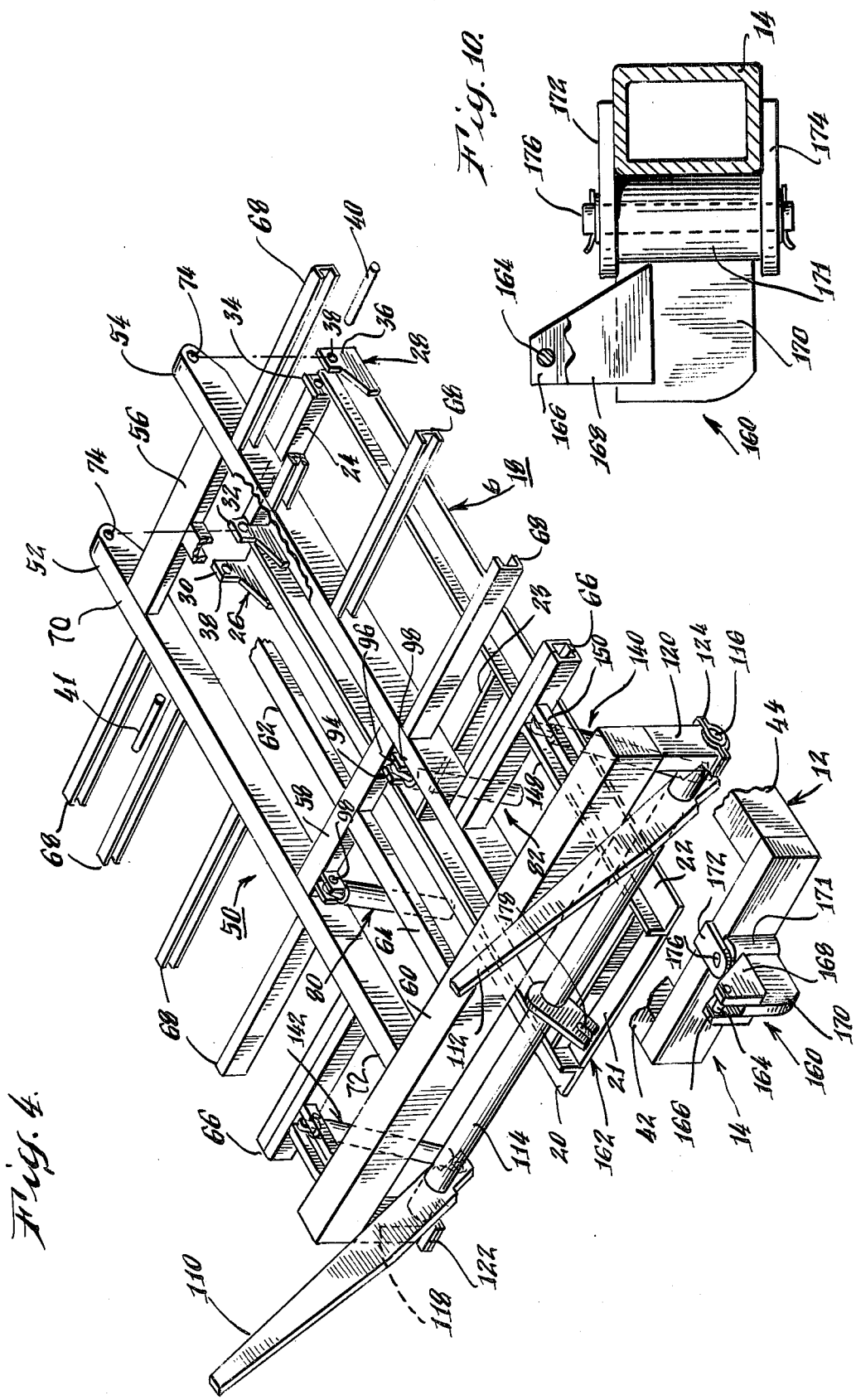

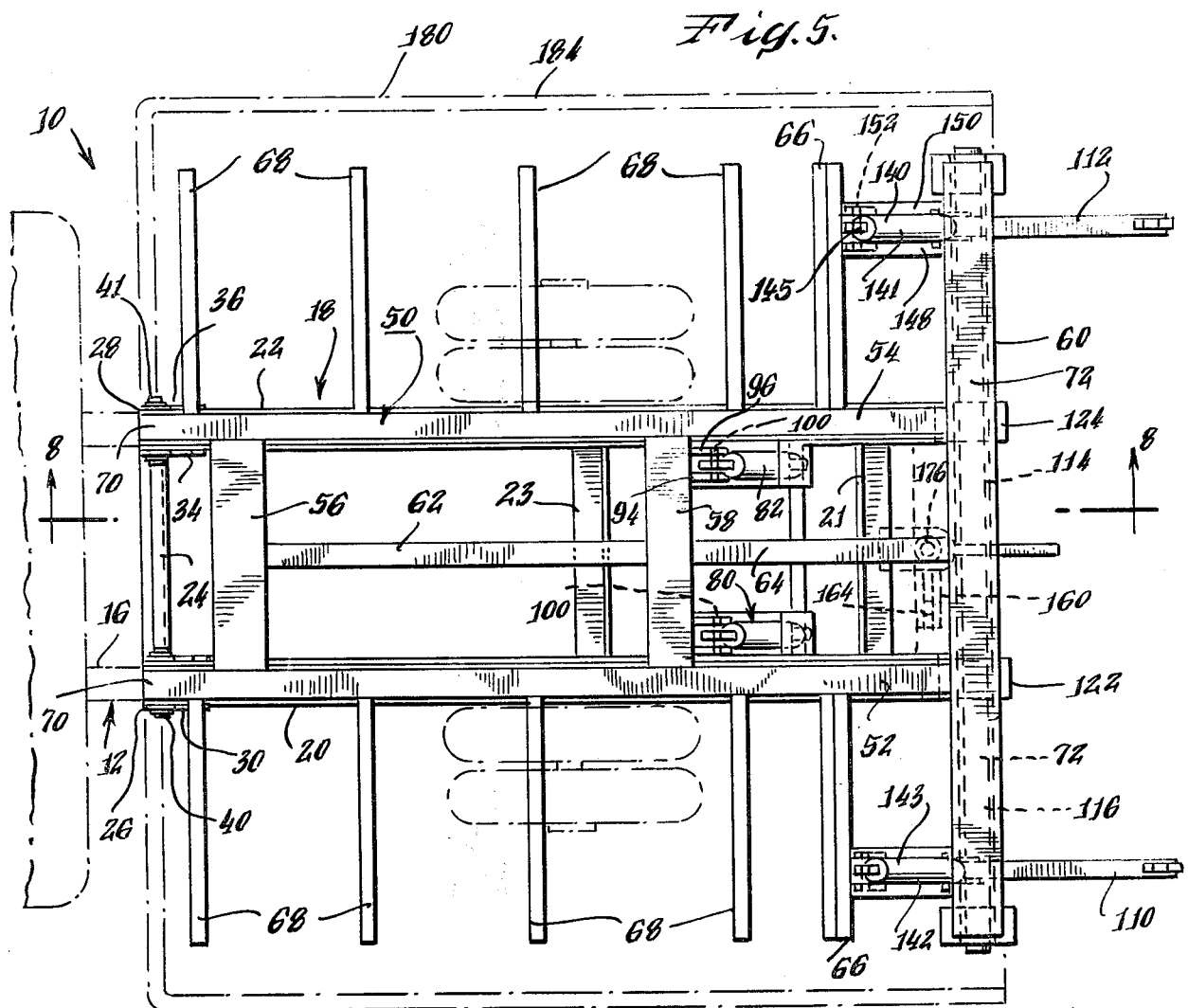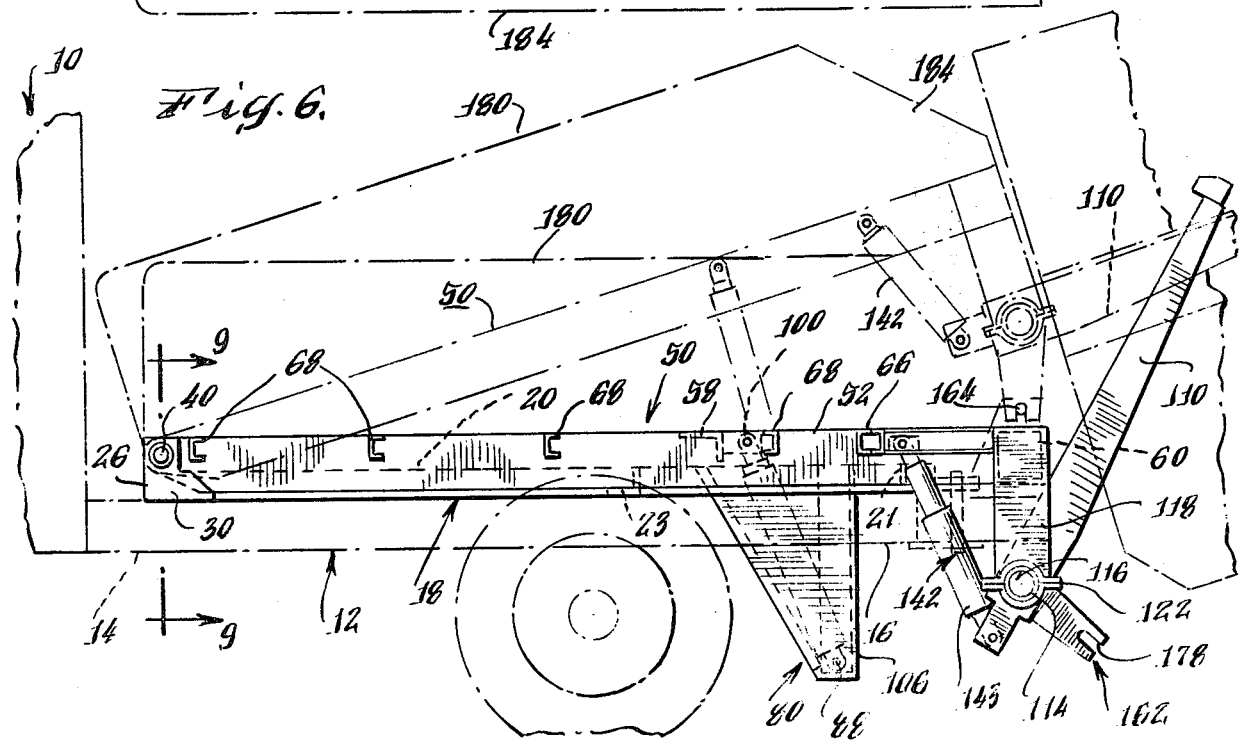

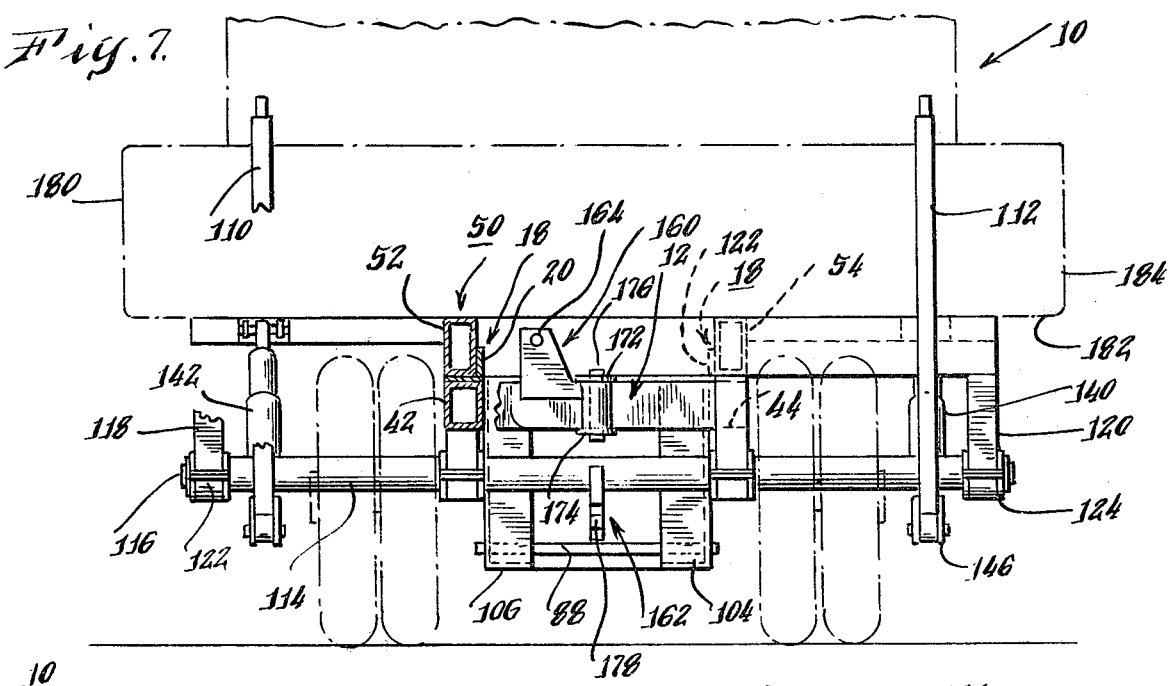
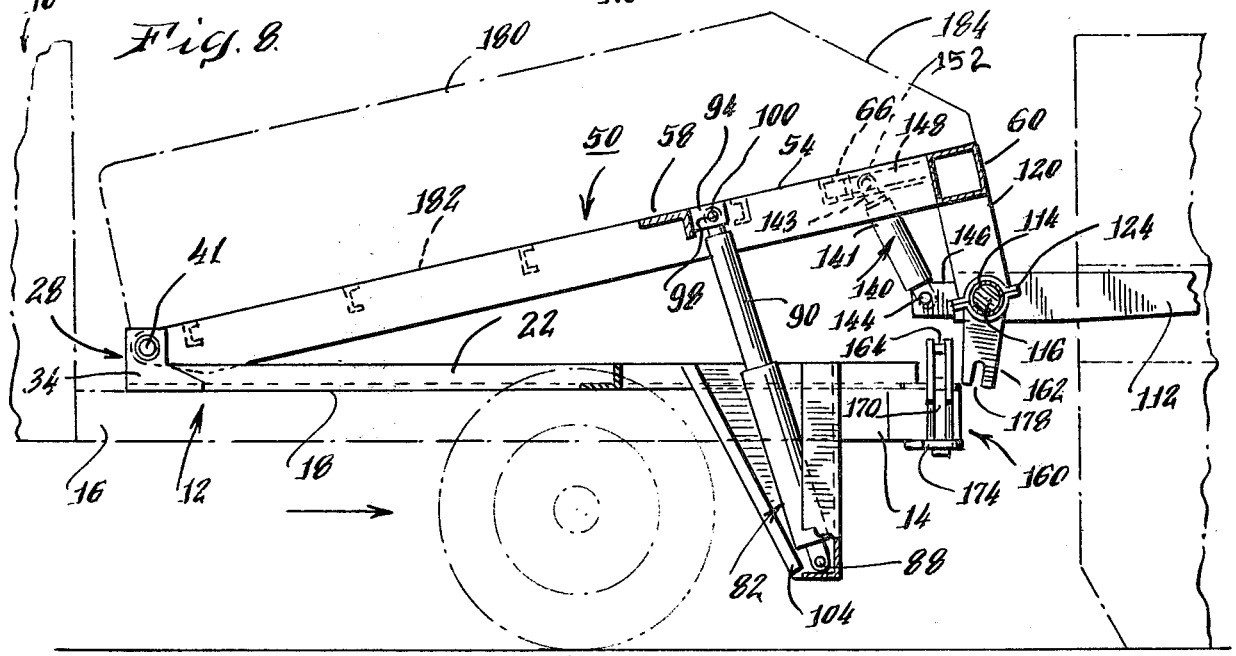
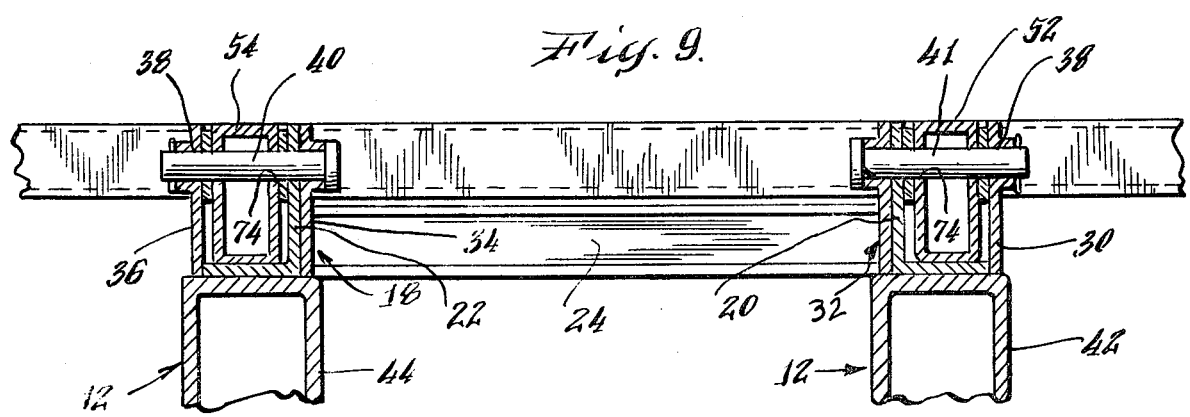

REFUSE CONTAINER TRANSPORT

BACKGROUND OF THE INVENTION

This invention relates to waste disposal apparatus. The invention relates more particularly to an improved vehicle for the repositioning and transport of refuse containers.

In a form of waste handling which has gained relatively wide acceptance in recent years, refuse and waste from a source, such as a residential building complex, an office building or a commercial establishment is accumulated over a period of time in a rigid, metal container. The container is relatively large and heavy and generally has to be handled by mechanical means. To this end the container is generally located in an area which is accessible to vehicles having means for handling a container. A container of this type is adapted to be raised by a refuse collection vehicle and to be tilted to an attitude for emptying the refuse content of the container into a receptacle of the vehicle. In a typical arrangement, the refuse container includes rigid sleeve members positioned on opposite sides of the container which are engaged by arms or forks extending from the refuse collection vehicle. The vehicle is maneuvered for providing that the arms or forks engage the container sleeves. The container is then lifted by mechanical means such as a hydraulic lift and is tilted for emptying its contents into the vehicle receptacle.

It is often necessary to reposition, maneuver or transport refuse containers from location to location. The need for movement arises for example when a refuse container is first transported to its site, when it is repositioned at the site, when it is moved from one site to another, and when it is returned to a shop for repairs. Since the containers are heavy and bulky, they are usually lifted and maneuvered only by mechanical means, such as by a refuse vehicle having hydraulicly actuated arms or forks. In one technique the containers are transported on a flatbed tractor or truck and are lifted off or on the flatbed trailer or truck at the site by a fork equipped refuse vehicle. In an alternative arrangement, a vehicle which is dedicated solely to the purpose of lifting and repositioning the refuse container has been provided.

These techniques for repositioning and transporting the refuse container are expensive and time consuming. The use of a flatbed trailer or truck for transporting the refuse container necessitates two vehicles, the flatbed truck and the additional fork equipped refuse vehicle for raising and lowering the containers onto and off of the truck. Operators for each of these vehicles must be provided. Thus, when it is desirable to transport a single container to or from a site or to reposition a container at a site, two vehicles and operators will be required. Committing this equipment and manpower to a single container movement is economically undesirable. The alternative is undesirable delay in the operation until a reasonable number of containers must be moved.

The use of a vehicle dedicated solely to the purpose of repositioning a refuse container is economically undesirable, since the vehicle serves virtually no other purpose than that of moving containers about. In the absence of the need to move containers the vehicle will generally remain idle.

Accordingly, it is an object of this invention to provide an improved vehicle for the movement of refuse containers.

Another object of the invention is to provide an improved vehicle for container movement which is adapted to provide additional utility.

Another object of the invention is to provide an improved means for mounting a refuse container handling means to a vehicle chassis.

Another object of the invention is to provide a vehicle having both utility body and handling means for a refuse container.

A further object of the invention is to provide a vehicle for refuse container movement having arms for engaging a refuse container and means for retracting the arms to an alternate position, thereby allowing the vehicle to be used for other purposes.

Still another object of the invention is to provide a container handling vehicle adapted to handle containers at locations heretofore considered inaccessible and at locations which substantially restrict maneuverability of the vehicle.

SUMMARY OF THE INVENTION

In accordance with features of the present invention, an improved vehicle is provided for the handling of refuse containers. The improved vehicle comprises a vehicle having a chassis, an elongated lifting frame which is supported by the chassis and means for elevating a rearward segment of the lifting frame with respect to a rearward chassis segment. First and second refuse container engaging arms are provided and are supported by the lifting frame near the rear segment for movement therewith. A utility vehicle body is mounted on the lifting frame. The position of the container engaging arms is varied in accordance with movement of the lifting frame. Container engagement is accomplished by positioning these arms in a desired attitude corresponding with sleeves on the container and moving the vehicle for providing engagement between the arms and sleeves. Upon elevating the lifting frame, the arms and thus the engaged container are raised vertically. Movement of the vehicle then provides for the desired repositioning of the supported container. The utility vehicle body which is mounted on the lifting frame adapts the vehicle for functions other than container handling. The vehicle is therefore useful both for container handling and for performance of other functions.

In accordance with other features of the invention, an apparatus is provided for modular adaptation of a vehicle, having a chassis, to refuse container handling and other use. The apparatus comprises an elongated base frame which is adapted to be mounted to a vehicle chassis, an elongated lifting frame which is positioned on the base frame and means providing pivotal coupling between the base frame and the lifting frame. An elongated body extends in a direction transverse to a length of the lifting frame and is rotatably supported from a rearward segment of this frame. A pair of spaced apart refuse container engaging arms are mounted to the elongated body and extend in a direction generally normal to the longitudinal axis of the elongated body. A utility body means is provided and is adapted for mounting on the lifting frame. A means, adapted to be coupled between the lifting frame and the chassis of the vehicle, is provided for rotating the lifting frame about the pivotal coupling means. A means is also provided and is coupled between the lifting frame and the elongated body for rotating the body and the supported arms about the longitudinal axis of the body. This apparatus provides a plurality of pre-assembled members thereby enabling modular construction and adaptation of a vehicle having a chassis to refuse container handling and other use.

In accordance with other features of the invention, a means is provided for retracting the container engaging arms to an alternate position at which the vehicle can be utilized for utility purposes other than container handling. In accordance with more particular features of the invention, a means is provided for supporting a refuse container on the vehicle chassis after the container has been engaged by the gripping arms.

BRIEF DESCRIPTION OF THE DRAWINGS

These and other objects and features of the invention will become apparent with reference to the following specifications and to the drawings wherein:

FIG. 4 is a fragmentary, perspective, exploded, partly broken away view of an apparatus for adapting a vehicle and chassis to refuse container handling and to another utility purpose;

FIG. 5 is a fragmentary, plan view, partly broken away, of a refuse container handling and general utility vehicle constructed in accordance with features of this invention;

FIG. 6 is a fragmentary, side elevation view of the vehicle of FIG. 5 illustrating alternative positioning of a lift frame of the vehicle;

FIG. 7 is a fragmentary, partly broken away and partly in section rear elevation view of the vehicle of FIG. 5;

FIG. 8 is a fragmentary view of FIG. 5 taken along line 8—8 of FIG. 5 and illustrating alternative positions of a lift frame of the vehicle;

FIG. 9 is a fragmentary view taken along line 9—9 of FIG. 6; and,

FIG. 10 is an enlarged side elevation view of a load support means.

DETAILED DESCRIPTION

Figure 1:
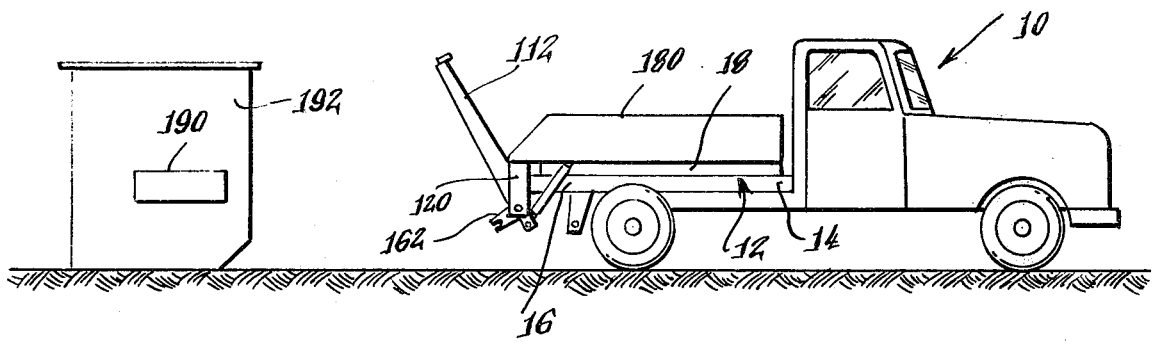
FIG. 1 is a side elevation view of a refuse container handling vehicle, constructed in accordance with features of this invention and illustrating the vehicle operating as a general utility vehicle.
Figure 2:
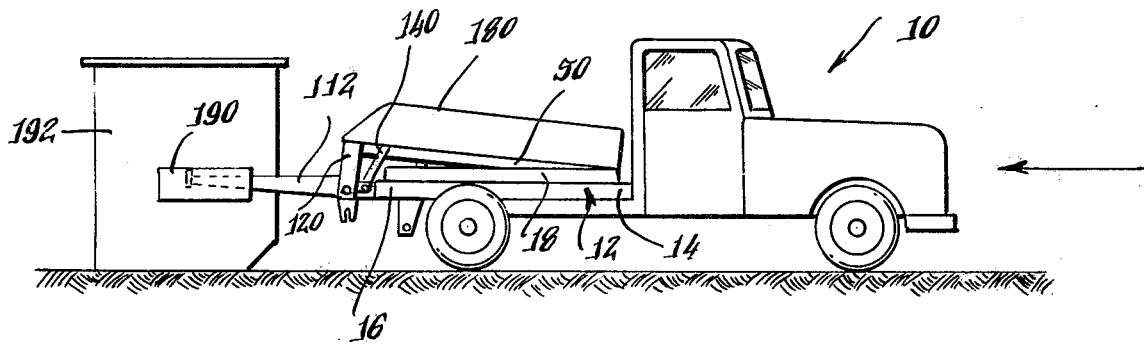
FIG. 2 is a side elevation view of the refuse container handling vehicle of FIG. 1 illustrating the vehicle engaging a refuse container.
Figure 3:
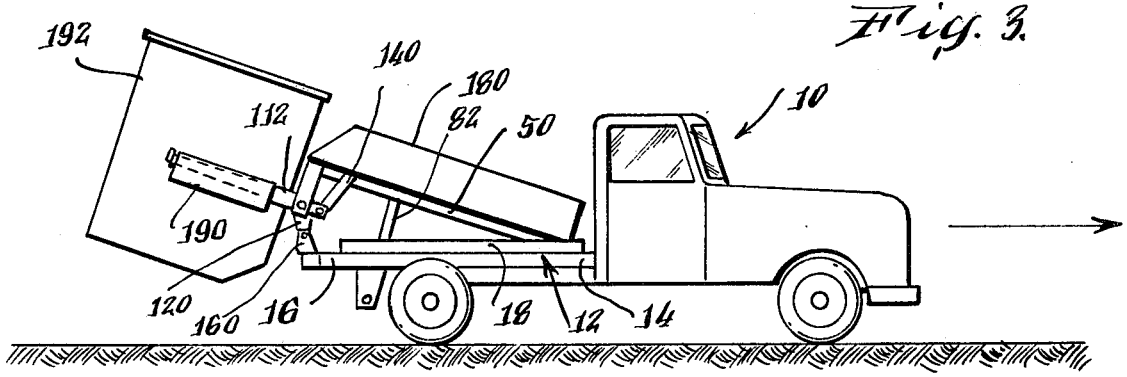
FIG. 3 is a side elevation view of the refuse handling vehicle of FIG. 1 illustrating the vehicle transporting a container.

Referring now to the drawings and particularly to FIGS. 1 through 3, a vehicle 10 is illustrated which provides for refuse container handling and alternative use. The basic vehicle includes various well known components which are not shown in detail. These components include an engine, transmission, drive coupling, and rear axle, wheels and tires, vehicle suspension, and chassis upon which a cab and engine coming is mounted. The chassis which is referred to generally by reference numeral 12 is supported in a well known manner on front and rear axles by a spring suspension. The chassis 12 is a well known vehicle component and comprises a plurality of elongated, tubular members of rectangular cross section secured together by welding for example, in a generally rectangular array. The chassis includes a support area thereon for receiving a utility body. In a preferred arrangement the vehicle and chassis comprise a truck vehicle and chassis, as for example, a chassis conforming to the well known pick-up truck chassis. As illustrated in FIGS. 2, 6, 7 and 8, the chassis 12 has relatively forward and rearward positioned segments 14 and 16 respectively.

An elongated base frame 18 is provided (FIG. 4) which is adapted to be mounted to the vehicle chassis 12. As illustrated in FIG. 4, the base frame 18 comprises first and second elongated, longitudinal, extending angle members 20 and 22 respectively, and transversely extending angle members 21, 23, and 24. The angle members are welded into a rigid, rectangular shaped base frame 18. A stationary pivot coupling comprising first and second U-shaped stationary members 26 and 28 is provided and is mounted to the base frame. The U-shaped stationary member 26 is formed by upstanding plates 30 and 32 (FIG. 9) which are welded to the angle member 20. Similarly, the U-shaped stationary member 28 comprises first and second upstanding plates 34 and 36 which are welded to the angle member 22. The base frame angle member 24 which extends transversely is welded to the plates 32 and 34. Each of the plates 30, 32, 34 and 36 includes an aperture 38 formed therein which is dimensioned and positioned for alignment between the apertures in these plates and for receiving pivot pins 40 and 41. The base frame assembly thus described is positioned on the chassis and the angle members 20 and 22 are secured thereto by welding to rectangular shaped chassis channel members 42 and 44 respectively.

An elongated lifting frame is provided and comprises a generally rectangular shaped frame 50 (FIG. 4) formed by first and second rectangular shaped channel members 52 and 54, which are rigidly assembled into a rectangular shape with cross members 56, 58 and 60. A longitudinally extending stiffener member 62 extends between the cross members 56 and 58 and a longitudinally extending stiffener member 64 extends between the cross members 58 and 60. The lifting frame members 52–64 are formed into a rigid assembly by welding. A plurality of transversely extending, rectangular shaped channel members 66 is provided and a plurality of transversely extending channel shaped members 68 is provided. These transversely extending members are mounted to the elongated lift frame members 52 and 54 by welding and are provided for supporting a vehicle utility body thereon.

The lift frame 50 includes relatively positioned forward and rearward frame segments 70 and 72 respectively. A rotatable pivot coupling is formed in the forward frame segments 70 of the lift frame and is adapted to receive the pivot pins 40 and 41 for engaging the stationary pivot coupling of the base frame, described hereinbefore. The rotatable pivot coupling comprises a plurality of aligned apertures 74 which are formed in side segments of the lift frame members 52 and 54. The lift frame members 52 and 54 are orientated and sized for positioning on the surfaces of the elongated angle members 20 and 22 as best illustrated in FIG. 9. In this position, the forward segment 70 of the lift frame member 52 nests between the upright plate members 30 and 32 of the U-shaped stationary pivotal coupling 26. Similarly, the forward segment 70 of the lift frame member 54 nests between the upright plates 34 and 36 of the stationary pivotal coupling 28. In this nesting attitude, the apertures 74 of the lift frame members 52 and 54 are aligned with the apertures 38 of the U-shaped stationary coupling members 26 and 28. The forward segment 70 of the lift frame members 52 and 54 and the apertures 74 formed therein comprise a rotatable pivot coupling for the lift frame member. The pivot pins 40 and 41 extend through the apertures 38 and 74 (FIG. 9). The lift frame is thereby pivotally mounted on the chassis for rotation about a pivotal mounting means.

A means for elevating the rearward frame segment 72 of the lift frame with respect to the rearward frame segment 16 of the chassis 12 is provided. This means includes a means for providing pivotal mounting of the forward lift frame segment 70, described hereinbefore, and a piston and cylinder means for rotating the lift frame about the pivotal mounting means. As illustrated in FIGS. 4, 5, 6 and 8, the piston and cylinder means comprises first and second piston and cylinder assemblies 80 and 82 which are coupled between the base frame and the lift frame. As best seen in FIG. 8, the piston and cylinder assembly 82 includes a cylinder coupled to a rod 88. The rod 88 extends between shrouds 104 and 106. The shroud 104 depends from and is secured to the angle member 22 of the base frame while the shroud 106 is similarly secured to the angle member 20 of the base frame. The rod 88 extends between the shrouds and is secured to end walls thereof by welding for example. These shrouds 104 and 106 which are mounted to the base frame members are preassembled to the base frame members and are readily mounted with the base frame for adapting a vehicle chassis for refuse container handling. Since the base frame is secured to the chassis, a cylinder of the piston and cylinder assembly 82 is coupled to the chassis through the rod 88, the shroud 104 and the frame member 22. A cylinder of the piston and cylinder assembly 80 is similarly coupled to the chassis through the rod 88, the shroud 106 and the base frame member 20. A piston 90 of the piston cylinder assembly 82 is coupled to the cross member 58 of the lift frame. A yoke formed by a pair of plates 94 and 96, which are welded to the cross member 58, includes apertures 98 formed therein. A pin 100 extends through the apertures and through an aperture formed in an end segment of the piston 90. A piston of the piston and cylinder assembly 80 is similarly coupled to the cross member 58. Extension of the piston from the piston and cylinder assemblies 80 and 82 causes the lift frame 50 to rotate and a rearward segment to elevate relative to the base frame 18. Similarly, retraction of the pistons causes the lift frame 50 to descend and nest with the base frame.

First and second elongated, refuse container engaging arms 110 and 112 respectively are supported by the rear segment 72 of the lifting frame for movement therewith. The arms 110 and 112 are mounted to an elongated, tubular shaped body 114 having a longitudinal axis 116 which extends in a direction generally transverse to the length of the lifting frame. The rearward segment 72 of the lifting frame which includes the transverse frame member 60 and depending bracket segments 118 and 120 extends rearwardly of the base frame thereby providing clearance for the body 114 during vertical motion of the lifting frame. The body 114 is rotatably mounted by first and second bearing surface means. The first bearing surface means is formed between the depending bracket 118 and a cooperating semicircular shaped clamp 122. The second bearing surface means is formed between the depending bracket 120 and a similar semi-circular shaped clamp 124. The clamps 122 and 124 are secured to the depending brackets 118 and 120 respectively by flanged edges and by bolts which are not illustrated for the purpose of clarity in the drawing. The refuse container engaging arms 110 and 112 are secured to the body 114 at predetermined spaced apart locations by welding for example, for rotation with the body 114 about the axis 116. The distance between the spaced apart arms 110 and 112 is determined by the distance between the separation between receiving sleeves 190 (FIG. 2) on a refuse container 192 which is to be handled.

A means for rotating the body 114 comprises first and second piston cylinder assemblies 140 and 142 (FIGS. 4–8) which are coupled between the body 114 and the lifting frame. A cylinder 141 of the piston-cylinder assembly 140 is, as illustrated in FIG. 8, pivotally coupled by a pin 144 to a U-shaped bracket 146 which is integrally formed with the arm 112 and is positioned at a diametrically opposite location about the body 114. A piston 145 of the piston cylinder 140 is pivotally coupled between longitudinally extending frame segments 148 and 150 by a pin 152. The piston and cylinder assembly 142 is similarly coupled between the arm 110 and the lifting frame. Extension of pistons from these assemblies causes the arms 110 and 112 to rotate in a counterclockwise direction as viewed in FIG. 6 to a relatively vertical attitude. Retraction of the pistons into the cylinders causes clockwise rotation of the arms 110 and 112 as viewed in FIG. 6 to a relatively horizontal attitude.

A support means is provided for coupling the body 114 to the chassis 12 in order to support this body and the rearward segment 72 of the lifting frame on the chassis. This feature is useful when a container is being transported, since it unloads the piston-cylinder assemblies 80 and 82 and extends their useful life. The support means includes a first support member 160 which is mounted to the chassis and a second support member 162 which is mounted to the body 114. The members 160 and 162 are adapted to be mutually engaged when the lift frame is rotated. The member 160 includes a support pin 164 which extends between plates 166 and 168, the plates being mounted to a support plate 170. The plate 170 is welded to a tubular body 171 (FIG. 10) and is pivotally mounted to horizontal plates 172 and 174 by a vertically extending rod 176 which extends between apertures in the plates 172 and 174 and through the tubular body 171. The support member 162 comprises a yoke shaped plate having a slot 178 formed therein. As the frame is rotated in a direction toward the chassis, the slot 178 will engage the pin 164 and the body 114 will thereby be supported on the chassis through the members 160 and 162. Since the body 114 is mounted to the lifting frame, the lifting frame will also be supported in this manner. Thus, when a load is positioned on the lifting arms 110 and 112, the load will be transmitted to the chassis via the body 114 and the members 160 and 162.

A utility vehicle body 180 is mounted on the lifting frame. The utility vehicle body is shown to comprise a pickup type body including a floor member 182 and upstanding wall member 184. The floor member is positioned on and is supported by the lifting frame and by the transversely extending channel members 66 and 64 (F(G. 4). It is secured thereto by welding for example.

In operation, the refuse handling vehicle is utilized as a general utility vehicle in which case, the lift frame is positioned on and is in contact with the base frame. The pistons of the piston and cylinder assembly 80 and 82 are then retracted into their cylinders as illustrated in FIG. 6, the refuse container engaging arms 110 and 112 are retracted to an attitude in which their extension from the body 114 is reduced and they are most proximate to the rear of the vehicle. In this condition, the pistons of the piston-cylinder assemblies 140 and 142 are extended from the cylinders as is illustrated in FIG. 6. The vehicle appears as illustrated in FIG. 1 and is adapted for general utility applications.

In refuse container handling, the pistons of the piston and cylinder assemblies 80 and 82 are extended partly to rotate the frame about the pivot coupling means and elevate a rearward segment of the frame above the chassis. The pistons of the piston and cylinder assemblies 140 and 142 are retracted for rotating the refuse container engaging arms 110 and 112 into a horizontal attitude in preparation for engagement of a refuse container. Under these conditions, the utility body is tilted upward in the rear while the arms are positioned for engaging receiving sleeves 190 of a refuse container 192. This is illustrated in FIG. 2 where the vehicle 10 is shown moving rearward to establish the engagement.

The pistons of the piston and cylinder assemblies 80 and 82 are extended to cause further elevation of the rearward segment of the frame above the chassis, thereby causing the engaged container 192 to be lifted off the ground as is illustrated in FIG. 3. When the container 192 is to be repositioned a short distance at a site, the vehicle 10 simply transports the container to that site and the pistons of the piston and cylinder assembly 80 and 82 are retracted for causing rotation of the lifting frame about its pivot coupling means and lowering of the rearward segment of the lifting frame. The refuse container will accordingly be lowered onto a surface.

When the container is to be transported for any distance, it is preferable that the load imparted to the vehicle by the refuse container and its contents, if any, be supported by the chassis rather than by the piston and cylinder assemblies 80 and 82. Accordingly, the pistons of the piston and cylinder assembly 80 and 82 are fully extended to elevate the rearward segment of the lifting fame to its highest position. At this time, the support member 160 is enabled by rotating it about its pivot rod 176. Lowering of the lifting frame and the support member 162 will engage the member 162 and the load supported on the arms 110 and 112 will be imparted to the chassis.

The piston-cylinder assemblies are hydraulically activated by well known hydraulic actuating means. Operator control for these assemblies can be conveniently positioned in the vehicle cab.

The described vehicle is advantageous in that it eliminates the need for two vehicles and two operators in transporting or repositioning a refuse container. The vehicle can handle containers often inaccessible to the larger trucks and carriers where maneuverability is limited. In addition, the vehicle is economically beneficial since it is not dedicated solely to the purpose of refuse container handling and the vehicle utility body is provided for enabling the vehicle to be used for other varied vehicular purposes. The apparatus described is also advantageous in that it enables adaptation of a vehicle and chassis to refuse container handling operations and to additional vehicular purposes through the use of modular components. These components include the base frame, the lifting frame, and the intercoupling members enumerated herein which may be pre-assembled and mounted to a standard vehicular or truck chassis.

There has thus been described an improved vehicle for handling refuse containers and which provides additional use for other vehicular purposes.

While there has been described a particular embodiment of my invention, it will be apparent to those skilled in the art that variations may be made thereto without departing from the spirit of the invention and the scope of the appended claims.

What is claimed is:

1. A vehicle for providing refuse container movement and alternative utility comprising:
    (a) a vehicle having a chassis;
    (b) said chassis having relatively forward and rearward positioned segments thereof;
    (c) an elongated lifting frame supported by said chassis;
    (d) said lifting frame having relatively forward and rearward positioned segments thereof;
    (e) means for elevating said rearward frame segment with respect to said rearward chassis segment;
    (f) first and second refuse container engaging arms supported by said lifting frame rear segment for movement therewith; and,
    (g) a utility vehicle body mounted on said lifting frame.

2. The vehicle of claim 1 wherein said elevating means elevates the rearward frame segment with respect to said forward frame segment and with respect to said rearward chassis segment.

3. The vehicle of claim 2 wherein said means for elevating said rearward frame segment includes means for providing a pivotal mounting for said forward frame segment and means for rotating said lifting frame about said pivotal mounting means.

4. The vehicle of claim 3 wherein said means for rotating said lifting frame about said pivotal mounting means comprises a piston and cylinder coupled between said chassis and said lifting frame.

5. The vehicle of claim 3 wherein said means for pivotally mounting said forward frame segment comprises a first pivot coupling means supported on said forward chassis segment, a second rotatable pivot coupling means formed in said forward frame segment, and pivot pin means for pivotally engaging said first and second coupling means.

6. The vehicle of claim 5 wherein said first pivot coupling means comprises first and second U-shaped members having apertures formed therein, said lift frame includes first and second elongated longitudinally extending frame members, said second rotatable pivot coupling means comprises segments of said frame members having apertures formed therein; said frame member segment apertures and said U-shaped member apertures positioned in alignment for receiving said pivot pin means; and said pivot pin means extends through said aligned apertures.

7. The vehicle of claim 6, including a base frame mounted to said chassis and said U-shaped members are integrally formed with said base frame.

8. The vehicle of claim 1 wherein said elongated lifting frame includes a plurality of members extending transversely to a length of said lifting frame for supporting said utility vehicle body.

9. The vehicle of claim 1 wherein said utility vehicle body includes floor and upstanding side members and said floor member is supported by said lifting frame.

10. The vehicle of claim 1 including means for rotating said arms about an axis which extends transversely to said elongated lifting frame.

11. The vehicle of claim 10 including an elongated body, means for rotatably mounting said body to said lifting frame at said rear segment for rotation of said body about said axis transverse to a length of said lifting frame, means for mounting said first and second arms at spaced apart locations on said body for rotation therewith, said arms mounted to said body to enable extension thereof in a direction which is normal to said transverse axis, and means for rotating said elongated body about said transverse axis.

12. The vehicle of claim 11 wherein said means for rotatably supporting said body comprises a bracket depending from said rear segment of said lifting frame, and first and second bearing means mounted to said bracket.

13. The vehicle of claim 11 wherein said means for rotating said elongated body comprises piston and cylinder means.

14. The vehicle of claim 13 wherein said piston and cylinder means for rotating said elongated body comprises first and second piston cylinder assemblies coupled between said body and said lifting frame.

15. The vehicle of claim 11 wherein said elongated body is supported by said lifting frame at a location extending rearwardly of a rearmost segment of said chassis.

16. The vehicle of claim 15 wherein said elongated body is cylindrically shaped and rotatably supported by first and second bearing means.

17. The vehicle of claim 15 including means for supporting said elongated body on said chassis.

18. The vehicle of claim 17 wherein said support means includes a first support member mounted to said chassis and a second support member mounted to said elongated body, said second support member is advanced into engagement with said first support member upon rotation of said lifting frame.

19. The vehicle of claim 18 wherein one of said support members is adapted to be selectively positioned for enabling or disabling engagement between said members.

20. The apparatus of claim 19 wherein said first support member is adapted to enable or disable engagement.

21. An apparatus for adapting a vehicle having a chassis to refuse container movement comprising:
  an elongated base frame adapted to be mounted to a vehicle chassis;
  said base frame having relative forward and rearward segments thereof.
  an elongated lifting frame positioned on said base frame;
  said lifting frame having relative forward and rearward segments thereof;
  means providing pivotal coupling between said base and lifting frames;
  an elongated body having an axis thereof extending in a direction transverse to a length of said lifting frame;
  means for rotatably supporting said elongated body from said rearward end segment of said lifting frame;
  means adapted to be coupled between said lifting frame and the chassis of a vehicle for rotating said lifting frame about said pivotal mounting means and elevating said rearward lifting frame segment relative to said forward segments of said lifting and base frames;
  means coupled between said lifting frame and said elongated body for rotating said body about said axis; and,
  first and second refuse container engaging arms mounted at spaced about positions on said elongated body.

22. The apparatus of claim 21 including a utility vehicle body mounted to said lift frame.

23. The apparatus of claim 21 wherein said means adapted to be coupled between said lifting frame and chassis comprises a piston and cylinder assembly, and means pivotally mounting said assembly to said base frame.

* * * * *